Patented July 11, 1939

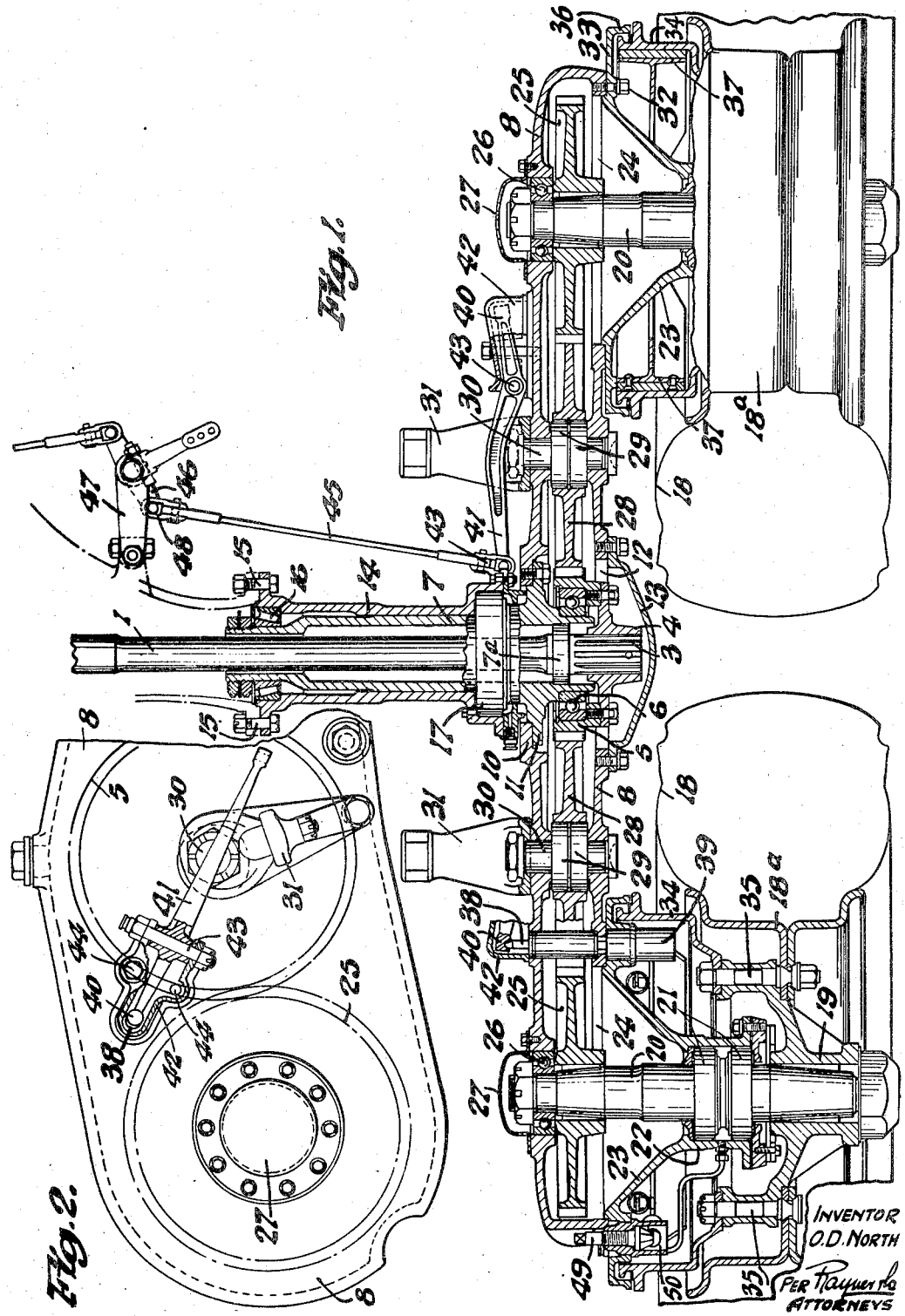

2,165,723

UNITED STATES PATENT OFFICE 2,165,723

AXLE MOUNTING AND DRIVING MECHANISM FOR THE DRIVING WHEELS OF MULTIPLE AXLE MOTOR ROAD VEHICLES

Oliver Danson North, Hunton Bridge, England, assignor to Scammell Lorries Limited, Watford West, England Application June 21, 1938, Serial No. 214,910
In Great Britain May 11, 1938

4 Claims. (Cl. 180—22)

The present invention relates to driving mechanism and the mounting of the axles for vehicles having more than two driving wheels, e. g. the class of vehicle known as a "six-wheeler", in which the driving wheels are mounted in two or more pairs carried by equalising levers or beams (hereinafter referred to as beams), each beam comprising a substantially totally enclosed casing in the ends of which two driving wheel axles are mounted, and at the centre of which is accommodated a primary or main gear wheel driven from a live axle about the axis of which the beam can oscillate. In such type of mounting for a pair of driving road wheels the wheel axles heretofore have been mounted in bearings in a pair of end housings bolted to the ends of a tubular beam containing at its centre the said primary gear wheel and opposite sides of the primary gear wheel intermediate or transmission gear wheels which transfer the drive of the primary gear wheel to a pair of gear wheels on the wheel axles. The central part of the beam is bolted to the outer end of a sleeve rotatable in bushes in an axle casing, whilst the rigidity of the beam is ensured by diagonal stays across it and a collar loose on the axle casing. The bolting on of the end housings to complete the whole beam necessitates great accuracy in the alignment and engagement of the opposed flanged faces of the end housings and the beam, whilst at the same time closely fitting sealed opposed faces are necessary to obviate escape of lubricant between the housings and beam. These desiderata whilst generally being achieved in the assembly of a new vehicle are not achieved so readily as may be desired, as due regard must be given to the accurate meshing of the wheel axle gear wheels and the said intermediate gear wheels to minimise noise and wear. If in the course of use the end housings are removed and/or the bolts connecting them to the ends of the beam are tightened up or adjusted any very slight alignment, or variations in the tightening efforts of the bolt nuts can affect undesirably the smoothness and efficiency of the assembly, and also the road wheels might not "track" accurately thereby throwing additional strain on the transmission and the bolts connecting the end housings to the beam and resulting in quick wearing away of the tyres. The chief object of this invention is to obviate these disadvantages.

In addition to the foregoing it has heretofore been regarded as convenient to adopt the said detachable end housings for the ready assembly and meshing engagement of the gear wheels of the driving wheel axles with the intermediate gear wheels, but in order to keep the wheel axles as short as reasonably possible, which is necessary, and to keep the road wheels and their brake drums as close as possible to the beams, the bolting of the end housings to the beam is not easily effected at the parts between the insides of the wheels and the beam and the practice has been to remove or shorten the bolt flanges of the housings and beam on the outer side of the beam and to omit bolts for a portion of the outer side in order to obviate obstruction to the cover plate or fixed member of each brake. These flanges, bolts, and the before-mentioned stays and the necessity to use bulky housings for strength added to the weight and expense of the arrangement, and another object of this invention is to provide a lighter yet more rigid arrangement of rocking beam and associated parts of the twin wheel drive. A still further object of this invention is to improve upon the arrangement of bearings for the beam and to have a more direct and efficient form of brake operating mechanism.

According to this invention the outer ends of the beam which receive the road wheel axles are integral, i. e. in one piece, with the central part of the beam carrying the pivotal means for the beam.

In the preferred embodiment of this invention driving mechanism and axle mounting for a multiple axle vehicle comprises for each geared pair of road wheels a one piece tubular beam totally enclosing the gear wheels connecting the main axle or driving shaft to the wheel axles, a pair of openings in the outer side of the beam for insertion and removal of the gear wheels of the road wheel axles, a pair of cover caps fixed over said openings and containing bearings for the road wheel axles, brake operating elements passing transversely through the beam and through said cover caps, a sleeve supported in roller bearings in a fixed axle casing and bolted to the centre of the beam, a bearing about the outer end of said sleeve supporting a primary gear wheel meshing with and interposed between a pair of transmission gear wheels in the beam meshing with the gear wheels on the road wheel axles, a driving shaft passing through and beyond said sleeve and secured at its outer end to said primary gear wheel, and a cover cap closing a central hole in the outer side of said beam for access to the primary gear wheel and its bearing. This central hole is preferably larger in diameter than the primary gear wheel to enable the primary gear wheel and its bearing to be fitted and removed through said hole.

In order that this invention may be clearly understood and readily carried into effect a sheet of drawings is appended hereto illustrating an embodiment thereof, and wherein Fig. 1 is a sectional plan view of a complete beam assembly, and, Fig. 2 is a broken elevation view of the inner side of one end of the beam and showing part of the brake operating mechanism for one of the wheels, portions of this mechanism being shown in section for clearness.

Referring to the drawing the main axle or driving shaft 1 is suitably splined at its inner end for connection to any convenient form of driving mechanism, e. g. a differential gear, and it is splined at its outer end as at 3 to receive a hub plate 4 carrying a primary driving gear wheel 5 supported by a ball bearing 6 the inner race of which is secured directly on the outer end of a sleeve 7 to which is fixed the central part of the beam 8. A packing ring and collar 7a is arranged within the sleeve 7 about the outer part of the driving shaft 1, and it will be seen that the bearing 6 serves as a main bearing of substantial form for the shaft 1 yet is compactly accommodated within the beam 8 by being in effect included in the primary driving gear wheel 5. Such an arrangement ensures considerably greater durability and smoothness than would be possible with a bush bearing directly engaging the shaft 1 and also the bearing and shaft are totally enclosed in the beam in a compact manner.

The beam 8 is a one-piece tube with a quite shallow transverse horizontal dimension and its inner wall is formed at its centre with an annular ledge 10 by which it is bolted to a substantial flange 11 integral with the sleeve 7. The primary gear wheel 5 and its bearing can be removed or inserted through an opening 12 in the centre of the beam 8, this opening being closed by a cover plate 13. The sleeve 7 is free to move about its axis within an axle casing 14 affixed by bolts 15 to the differential or equivalent gear housing. Roller bearings 16 and 17 support the sleeve 7 near its inner and outer ends respectively whereby the sleeve is firmly supported for affording freedom of angular movement of the beam 8.

The two road wheels 18 are keyed by their hubs 19 on the wheel axles 20 supported at opposite ends of the beam 8, and each axle 20 is supported between its ends on double roller bearings 21 accommodated within a cylindrical box 22 at the outer end of and integral with a cover cap 23 of truncated conical form. The two cover caps 23 close holes 24 in the outer faces of the beam 8 near its outer end, and these holes 24 are of such diameter that gear wheels 25 keyed on the axles 20 can be inserted and removed therethrough. Ball bearings 26 locate the inner ends of the two axles 20 in correct alignment in the beam, and cover caps 27 on the inner faces of the beam afford access to the bearings 26.

The axle gear wheels 25 are in mesh with a pair of intermediate or transmission gear wheels 28 which transmit the drive of the primary gear wheel 5 to the wheel axle gear wheels 25. These intermediate gear wheels 28 rotates on roller bearings 29 on a pair of stout bolts 30 passed transversely through the beam, and advantage is taken of these bolts to support a pair of abutment brackets or buffers 31 which limit the angle of oscillation of the beam by abutting against suitable stops on the vehicle when the beam assumes a predetermined maximum angle in relation to the vehicle frame.

The cover caps 23 supporting the wheel axles are secured by studs 32 to the ends of the beam, these studs being passed through flanges 33 integral with the cover caps and of such diameter as to serve as the fixed cover plates of two brake drums 34 to which are secured by the wheel bolts 35 the wheel rims 18a. By this means the detachable cover caps 23 serve the dual purpose of supporting the wheel axles and covering the inner sides of the brake drums, the peripheries of the two cover caps being flanged as at 36 to encircle the inner sides of the brake drums. Such an arrangement enables the wheels 18 to be kept close to the beam and for the driving axles to be kept short and also firmly supported by substantial bearings. Still further there is ample annular space between the cover caps 23 and the brake drums 34 to accommodate the brake shoes 37, and also to carry the brake shoe expanding devices directly through the flanges 33 of the said cover caps in order to adequately protect such devices and obviate exposed links and levers on the outer side of the beam 8. The arrangement shown is advantageous because brake operating plunger rods 38 can be passed transversely through the beam 8 just above or below the meshing points of the gear wheels 25 and 28 and engaged at their outer ends directly in the plunger-like wedging members 39 of the brakes and at their inner ends engaged directly in the socketed ends 40 of two brake levers 41 fulcrumed at 43 in housings or brackets 42 secured by studs 44 to the inner side of the beam 8. These two brake levers are connected by limbs 45 to a lever 46 pivoted to a bracket 47 carried by the differential or equivalent gear housing, universal joints 48 at the ends of the links affording the requisite play in the links during oscillations of the beam 8.

The flanges 33 of the truncated conical cover caps 23 extend outside the ends of the one-piece beam 8 to enable large diameter brake drums to be used with as short and light a beam as possible, and advantage is taken of this arrangement to support brake shoe adjusting bolts 49 in bushes 50 in the flanges 33 close to the ends of the beam, whereby adjustments to the brake shoes can be effected readily.

By means of the present invention a very strong yet compact and relatively light beam and driving mechanism for a rocking beam type of twin driving wheel support is provided in which all of the parts are easily accessible. Highly efficient braking means are provided also sturdy ball and roller bearings are adopted for all rotary and oscillating parts.

I claim:

1. Oscillatable beam and driving mechanism for a pair of road driving wheels for a motor road vehicle adapted to have more than one pair of driving road wheels comprising a one piece tubular beam, a pair of openings in the outer side of the beam for insertion and removal of the gear wheels of the road wheel axles, a pair of cover caps fixed over said openings, bearings for the road wheel axles in said pair of cover caps, brake operating elements passing transversely through the beam and through said cover caps, a fixed axle casing, bearings in said fixed axle casing, a sleeve supported in said bearings and bolted to the centre of the beam, a bearing about the outer end of said sleeve, a primary gear wheel supported by said bearing, gear wheels in the one-piece beams fixed on the road wheel axles, a pair of transmission gear wheels in the beam meshing with the primary gear wheel and the gear wheels on the road wheel axles, a driving shaft passing through and beyond said sleeve and secured at its outer end to said primary gear wheel, and a cover cap closing a central hole in the outer side of said beam for access to the primary gear wheel and its bearing.

2. Oscillatable beam and driving mechanism for a pair of road driving wheels for a motor road vehicle adapted to have more than one pair of driving road wheels comprising a one piece tubular beam, a pair of openings in the outer side of the beam for insertion and removal of the gear wheels of the road wheel axles, a pair of cover caps fixed over said openings, bearings for the road wheel axles in said pair of cover caps, brake operating elements passing transversely through the beam and through said cover caps, a fixed axle casing, bearings in said fixed axle casing, a sleeve supported in said bearings and bolted to the centre of the beam, a bearing about the outer end of said sleeve, a primary gear wheel supported by said bearing, gear wheels in the one piece beams fixed on the road wheel axles, a pair of transmission gear wheels in the beam meshing with the primary gear wheel and the gear wheels on the road wheel axles, a driving shaft passing through and beyond said sleeve and secured at its outer end to said primary gear wheel, a cover cap closing a central hole in the outer side of said beam for access to the primary gear wheel and its bearing, brake drums on said road wheel axles and flanges on said pair of cover caps appropriate to the road wheel axles forming the fixed cover plates of the brake drums.

3. Oscillatable beam mounting and driving mechanism for a pair of road driving wheels for motor road vehicle comprising a one-piece tubular main beam element, a driving shaft engaged in the centre of said casing about which the main beam oscillates, two openings in the outer face of the main beam near its ends, two lateral cover caps fitted over said openings, road wheel axles and bearings therefor within said cover caps, a central opening in the outer face of the beam, a cover cap over said central opening, a primary gear wheel on said driving shaft in the beam accessible by removal of said central cover cap, intermediate gearing enclosed in said beam transmitting the drive from the said shaft to said axles, and brake operating members passed transversely through the beam and said end pair of cover caps at points displaced substantially vertically beyond the meshing points of the road wheel axle gear wheels and the said intermediate gear wheels in the beam.

4. Oscillatable beam and driving mechanism for a pair of road driving wheels for a motor road vehicle adapted to have more than one pair of driving road wheels comprising a tubular beam, a pair of cover caps fixed to said beam, bearings for the road wheel axles in said pair of cover caps, a fixed axle casing, bearings in said fixed axle casing, a sleeve supported in said bearings and bolted to the centre of the beam, a bearing about the outer end of said sleeve, a primary gear wheel supported by said last named bearing, gear wheels in the beam fixed on the road wheel axles, transmission gear wheels in the beam meshing with the primary gear wheel and the gear wheels on the road wheel axles, and a driving shaft passing through and beyond said sleeve and secured at its outer end to said primary gear wheel.

OLIVER DANSON NORTH.